United States Patent [19]
Hwang et al.

[11] Patent Number: 6,136,284
[45] Date of Patent: Oct. 24, 2000

[54] PROCESS FOR THE REMOVAL OF NITROGEN OXIDES FROM GAS STREAMS

[75] Inventors: Shuen-Cheng Hwang, Chester, N.J.; Mark H. Anderson, Bethlehem, Pa.; Ravi Jain, Bridgewater, N.J.; Neeraj Saxena, Murray Hill, N.J.; James K. Tseng, Berkeley Heights, N.J.; Robert Francis Workosky, Macungie, Pa.

[73] Assignee: The BOC Group, Inc., Murray Hill, N.J.

[21] Appl. No.: 09/457,778

[22] Filed: Dec. 9, 1999

[51] Int. Cl.⁷ ........................................................ C01C 3/00
[52] U.S. Cl. ............................................. 423/235; 423/400
[58] Field of Search ....................................... 423/235, 400

[56] References Cited

U.S. PATENT DOCUMENTS

| | | | |
|---|---|---|---|
| 4,011,298 | 3/1977 | Fukui et al. | 423/235 |
| 4,119,703 | 10/1978 | Nishida et al. . | |
| 4,247,321 | 1/1981 | Persinger | 423/235 |
| 4,975,256 | 12/1990 | Hegedus et al. . | |
| 5,206,002 | 4/1993 | Skelley et al. . | |
| 5,233,934 | 8/1993 | Krigmont et al. . | |
| 5,266,292 | 11/1993 | Bagg et al. | 423/400 |
| 5,316,737 | 5/1994 | Skelley et al. . | |
| 5,318,763 | 6/1994 | Bagg et al. | 423/400 |
| 5,453,258 | 9/1995 | Lippmann et al. . | |
| 5,482,692 | 1/1996 | Audeh et al. . | |
| 5,589,147 | 12/1996 | Farnos et al. . | |
| 5,612,010 | 3/1997 | Pandey et al. . | |
| 5,743,929 | 4/1998 | Kapoor et al. . | |

*Primary Examiner*—Tom Dunn
*Attorney, Agent, or Firm*—Philip H. Von Neida; Salvatore P. Pace

[57] ABSTRACT

The present invention relates to a process for removing nitrogen oxides from gas streams such as furnace or utility boiler flue gas streams. An ozone adsorption system is used to adsorb and concentrate ozone. A slip stream containing nitrogen oxides is introduced into an ozone adsorption system to desorb ozone and the ozone-containing slip stream gas is then directed to a reactor duct along with the primary nitrogen oxide-containing gas stream where the nitrogen oxides are converted to $N_2O_5$.

14 Claims, 1 Drawing Sheet

PROCESS FOR THE REMOVAL OF NITROGEN OXIDES FROM GAS STREAMS

FIELD OF THE INVENTION

The present invention relates to a process for removing nitrogen oxides from flue gas streams utilizing ozone, more particularly the present invention provides for means to concentrate the ozone prior to its reaction with the nitrogen oxides in the flue gas streams.

BACKGROUND OF THE INVENTION

Recent federal and local environmental laws require very significant reduction of discharge of harmful gaseous substances into the atmosphere. Chief among such harmful air pollutants are nitrogen oxides ($NO_x$). In response to strict enforcement efforts of these laws, industrial air polluters have made considerable efforts to reduce the amount of these harmful substances into the air in gaseous effluents from industrial or municipal sources. Successful efforts to reduce the concentration of $NO_x$ in gaseous effluents often involve reacting the $NO_x$ in waste gases with nitrogen-based reducing agents. One commercially used method of reducing $NO_x$ from gas streams involves contacting the $NO_x$ with ammonia or an ammonia precursor, such as urea, in the absence of a catalyst, a technique known as selective non-catalytic reduction (SNCR). The ammonia reduces the $NO_x$ to nitrogen while itself being oxidized to nitrogen and water. Typical SNCR-based processes are disclosed in U.S. Pat. Nos. 5,233,934 and 5,453,258. SNCR processes require very high temperatures, for instance temperatures in the range of about 800 to 1200° C., and even at these temperatures only low conversions of $NO_x$ are achieved. For example, it is not uncommon to attain $NO_x$ reductions in the range of 40 to 50% by SNCR-based processes.

Another technique for removing $NO_x$ from waste gas streams involves contacting the waste gas with ammonia or an ammonia precursor in the presence of a substance which catalyzes the reduction of $NO_x$ to nitrogen, as in SNCR processes. These catalytic reduction processes are referred to as selective catalytic reduction (SCR). SCR processes have a few advantages over SNCR processes. They can be carried out at temperatures significantly lower than the temperatures at which SNCR processes are carried out. For example, they are quite effective at temperatures in the range of about 250 to 600° C. Typical SCR processes are described in detail in U.S. Pat. Nos. 4,119,703, 4,975,256, 5,482,692, 5,589,147, 5,612,010 and 5,743,929. Although SCR processes are much more efficient than SNCR processes in the reduction of $NO_x$ to nitrogen, they have the disadvantages of being more costly than SNCR processes, the catalyst can be poisoned or deactivated and often they do not remove all of the $NO_x$ from the gas stream being treated.

Another disadvantage of both SCR and SNCR processes is that ammonia, which itself is regarded as an environmentally unacceptable pollutant, is often released into the atmosphere in the gaseous effluent from the reactor because the reactions are often conducted in the presence of excess ammonia and/or because of sudden changes in the process that produces the $NO_x$. Ammonia may also be released because of depletion or masking of the catalyst by contamination over time.

Another known method of removing $NO_x$ from gas streams involves contacting the $NO_x$ with ozone, thereby oxidizing them to higher nitrogen oxides, such as $N_2O_5$ and removing the higher oxides from the gas stream by means of aqueous scrubbers.

Specific details of ozone-based $NO_x$ oxidation processes are disclosed in U.S. Pat. Nos. 5,206,002 and 5,316,737, the disclosures of which are incorporated herein by reference. Ozone-based $NO_x$ oxidation processes are quite expensive because of the high cost of producing ozone.

Because of stringent environmental regulations, efforts are continuously made to improve $NO_x$ removal processes to minimize or eliminate emission of $NO_x$ into the atmosphere. This invention provides a process which accomplishes this objective.

SUMMARY OF THE INVENTION

The present invention provides for a process for removing nitrogen oxides ($NO_x$) from gas streams and a process for concentrating ozone for use in removing $NO_x$. The process comprises feeding the ozone/oxygen product stream from an ozone generator into an adsorbent reactor bed containing a suitable adsorbent for ozone. An ozone adsorption system is used to adsorb and concentrate ozone. The exiting gas stream which is predominantly oxygen is recycled to the ozone generator. The flue gas stream containing the nitrogen oxides is directed into the adsorbent reactor where the nitrogen oxides react with the ozone to produce $N_2O_5$ and if moisture is present in the flue gas, $HNO_3$ and is removed from the exhaust.

A typical ozone generator can generate a product stream that contains about 10 weight percent ozone. The ability to concentrate the ozone is economical in those systems where large amounts of ozone are needed. The present invention provides further economies in reducing the size of both the oxygen generator and the oxidation reactor.

DETAILED DESCRIPTION OF THE INVENTION

Figure 1:
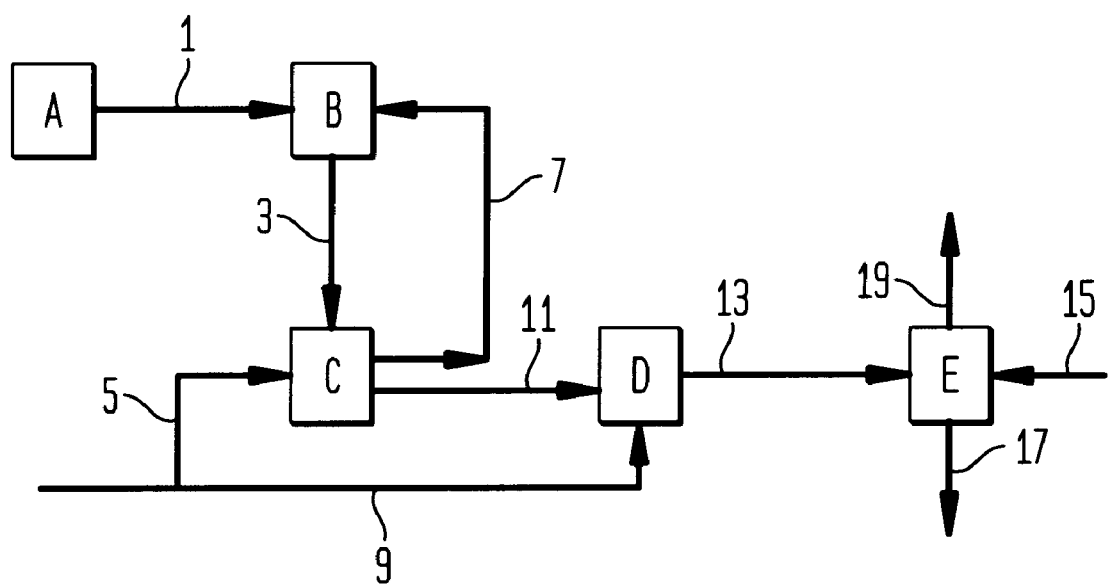
FIG. 1 is a schematic representation of an embodiment of a gas purification system under which the present invention can be practiced.

The present invention relates to a process for removing nitrogen oxides from a gas stream comprising the steps of feeding an ozone/oxygen stream into an ozone adsorption system; feeding a slip stream from the nitrogen oxides-containing gas stream into the ozone adsorption system, whereby ozone is desorbed from the system and into the gas stream; and feeding the ozone-containing slip stream and the nitrogen oxides-containing gas stream into a reaction duct, whereby the nitrogen oxides are converted to $N_2O_5$.

In the process of the present invention, an ozone/oxygen gas stream is produced by an ozone generator and is fed into an adsorbent bed containing a suitable adsorbent for ozone. The stream exiting the adsorbent system is primarily oxygen and is recycled to the ozone generator.

The nitrogen oxides-containing gas stream is split with a slip stream of this gas being fed into the ozone adsorbent system where ozone is desorbed. This now ozone-containing slip stream is fed to a reactor duct where it is combined with the main portion of the split nitrogen oxide-containing gas stream.

In the reaction duct, the nitrogen oxides ($NO_x$) will be oxidized into $N_2O_5$ and if moisture is present from the air, nitric acid will also be produced. The stream that exits the reactor duct containing the $N_2O_5$ and nitric acid can then be fed to a wet scrubber where the excess $N_2O_5$ is dissolved in the water forming nitric acid and is scrubbed out of the exhaust gas stream.

For a more detailed description of the invention, reference is made to FIG. 1. Oxygen generator A provides oxygen to ozone generator B through line 1. The oxygen generator can be any equipment that produces oxygen or oxygen-enriched gas from air. Typically, the generator is an adsorption unit or a small cryogenic air separation plant. Alternatively, oxygen or oxygen-enriched air can be introduced into the system from an external source.

The ozone generator B can be any type of ozonizer, such as a high voltage corona discharge generator. Typically, the ozone-containing gas comprises about 3 to about 10% by weight ozone with the balance being oxygen and air components. The ozone generator connects to the ozone adsorption system C through line 3 through which the ozone/oxygen mixture passes.

The ozone adsorption system C, as noted, receives the ozone/oxygen mixture through line 3 from the ozone generator. Line 7 returns the oxygen that is the by-product of the ozone adsorption to the ozone generator. This recycled oxygen makes the overall process more efficient and economical.

The ozone adsorption system receives the slip stream of nitrogen oxides-containing gas stream through line 5 from the primary gas stream containing the nitrogen oxides line denoted as 9. The nitrogen oxides-containing gas stream can be any gas stream containing these impurities but is typically a furnace flue gas.

The ozone adsorption system can be either a dual fixed-bed configuration for the adsorption and regeneration cycles, or it can be a rotor wheel in the form of disk or cylinder. In the case of a rotor wheel, it is constructed from a structured sorbent which, as the rotor wheel rotates, will alternate the adsorption and the regeneration sections of the rotor. The rotor wheel can be configured such that the ozone gas is passing through the adsorption section for a set period and then the nitrogen oxide-containing gas passing through the regeneration section of the rotor wheel over set intervals of time. These time intervals will vary of course depending upon the level of contamination of the gas stream being treated but also by the structured sorbent material employed.

Preferably, the structured sorbent material employed in either of the two type of adsorption systems is silica gel. Other structured sorbent materials include but are not limited to silicalite, dealuminated Y zeolite (DAY), etc.

The reactor duct D receives ozone-rich slip stream through line 11 and the primary nitrogen oxides-containing gas streams through line 9. The reactor duct may be any suitable reactor for effecting the intimate mixing of the nitrogen oxides-containing gas streams and the ozone. It may be an empty vessel containing mixing baffles or it may be packed with an inert material to enhance contact between the ozone and the gas being treated.

The treated gas stream exits the reactor duct through line 13. This stream comprises mostly air, $N_2O_5$, $HNO_3$ and water and enters the scrubber system E. Scrubber system E is provided with scrubbing liquid feed line 15, scrubbing liquid discharge line 17 and purified gas discharge line 19. The scrubber may be any suitable vessel and can be equipped with baffling or an inert material to enhance contact between the scrubbing liquid and the gas that is being purified.

The aqueous liquid scrubbing step is preferably carried out at a pH greater than 7, and is most preferably carried out at a pH greater than 9. The aqueous liquid may be water, in which case a dilute aqueous nitric acid solution will be produced. However, in preferred embodiments, the aqueous liquid is a dilute basic solution. Suitable basic aqueous solutions include alkali metal hydroxides, such as sodium hydroxide, potassium hydroxide, etc. and alkaline earth metal hydroxides, such as calcium hydroxide, magnesium hydroxide, etc. and ammonium hydroxide. Preferably the aqueous solution contains a base having good water solubility, such as sodium hydroxide, potassium hydroxide, ammonium hydroxide, etc. A more preferred caustic solution is aqueous sodium hydroxide, which is readily available, relatively inexpensive and produces environmentally acceptable products upon reaction with the flue gas components. The temperature and pressure at which the aqueous scrubbing step is carried out are not critical. This step is typically carried out at a temperature in the range of about 10° to about 90° C., and is preferably carried out at a temperature in the range of about 20° to about 60° C. and is generally carried out at about atmospheric pressure. The scrubbing liquid can be either in the form of a spray if the scrubber is a hollow chamber or a trickle stream if the scrubber is packed with inert packing. The scrubbing liquid washes out the $N_2O_5$ and/or $HNO_3$ from the gas being treated and passes out line 17 as a dilute nitric acid or nitrate solution.

The purified gas stream which is substantially depleted of nitrogen oxides passes out of the scrubber system through line 19 and is discharged to the atmosphere or for further processing.

It will be appreciated that it is within the scope of the present invention to utilize conventional equipment to monitor stream concentrations and automatically regulate the flow of the various process streams within the system so that the system can be fully automated to run continuously in an efficient manner.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

Having thus described the invention, what we claim is:

1. A process for removing nitrogen oxides from a gas stream comprising:
   feeding an ozone/oxygen stream into an ozone adsorption system;
   feeding a slip stream from said nitrogen oxides-containing gas stream into said ozone adsorption system, whereby ozone is desorbed from said system; and
   feeding the ozone-containing slip stream and said nitrogen oxides-containing gas stream into a reaction duct, whereby the nitrogen oxides are converted to $N_2O_5$.

2. The process as claimed in claim 1 wherein said ozone adsorption system is a dual fixed-bed configuration for both adsorption and regeneration cycles.

3. The process as claimed in claim 1 wherein said ozone adsorption system is a rotary wheel adsorber containing a structured sorbent.

4. The process as claimed in claim 3 wherein said structured sorbent is selected from the group consisting of silica gel, silicalite and dealuminated Y zeolite.

5. The process as claimed in claim 3 wherein said rotary wheel adsorber alternates between adsorption and regeneration sections as it rotates.

6. The process as claimed in claim 1 wherein said ozone/oxygen stream is from an ozone generator.

7. The process as claimed in claim 6 wherein said ozone/oxygen stream contains from about 3 to about 10 weight percent ozone.

8. The process as claimed in claim 5 wherein the oxygen from said ozone adsorption system is recycled to said ozone generator.

9. The process as claimed in claim 1 further containing the step of feeding the gas stream from said reaction duct into a wet scrubber system.

10. The process as claimed in claim 9 wherein the aqueous liquid in said wet scrubber system is water.

11. The process as claimed in claim 9 wherein the aqueous liquid is a dilute basic solution.

12. The process as claimed in claim 1 further containing the step of feeding the gas stream also contains sulfur oxides.

13. The process as claimed in claim 1 wherein said nitrogen-oxide containing gas stream is a flue gas stream.

14. The process as claimed in claim 1 wherein said nitrogen oxides-containing gas stream is a furnace or utility boiler flue gas stream.

* * * * *